(12) United States Patent
Sen et al.

(10) Patent No.: US 10,402,096 B2
(45) Date of Patent: Sep. 3, 2019

(54) UNALIGNED IO CACHE FOR INLINE COMPRESSION OPTIMIZATION

(71) Applicant: EMC IP Holding Company LLC, Hopkinton, MA (US)

(72) Inventors: Soumyadeep Sen, Highland Park, NJ (US); Philippe Armangau, Acton, MA (US); Christopher A. Seibel, Walpole, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/884,739

(22) Filed: Jan. 31, 2018

(65) Prior Publication Data

US 2019/0235759 A1 Aug. 1, 2019

(51) Int. Cl.
*G06F 3/06* (2006.01)
*G06F 12/128* (2016.01)
*G06F 12/123* (2016.01)

(52) U.S. Cl.
CPC ............ *G06F 3/0608* (2013.01); *G06F 3/065* (2013.01); *G06F 3/0613* (2013.01); *G06F 3/0641* (2013.01); *G06F 3/0656* (2013.01); *G06F 3/0685* (2013.01); *G06F 12/123* (2013.01); *G06F 12/128* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 8,898,351 B2 | 11/2014 | Povaliaev et al. | |
| 9,170,942 B1 | 10/2015 | Derbeko et al. | |
| 9,727,479 B1 | 8/2017 | Armangau et al. | |
| 9,772,789 B1 | 9/2017 | Natanzon et al. | |
| 9,779,023 B1 | 10/2017 | Armangau et al. | |
| 2011/0107052 A1* | 5/2011 | Narayanasamy | G06F 3/0608 711/171 |

* cited by examiner

*Primary Examiner* — Kevin Verbrugge
(74) *Attorney, Agent, or Firm* — BainwoodHuang

(57) ABSTRACT

Techniques for processing unaligned IO requests in data storage systems that provide optimization of inline compression. The disclosed techniques employ an unaligned IO cache, which is used by a data storage system to process unaligned IO requests containing data with sizes that are not multiples of a predetermined block size. By employing the unaligned IO cache while processing such unaligned IO requests, the data storage system can reduce the number of read-modify-write sequences required to process a sequential load of unaligned IO requests, thereby reducing the burden on processing resources of the data storage system.

16 Claims, 3 Drawing Sheets

UNALIGNED IO CACHE FOR INLINE COMPRESSION OPTIMIZATION

BACKGROUND

Conventional data storage systems typically include one or more storage processors coupled to one or more arrays of non-volatile storage devices, such as, for example, magnetic disk drives, electronic flash drives, and/or optical drives. The storage processors are configured to service input/output (IO) requests generated by host computers that specify files, blocks, or other data elements to be created on, read from, written to, and/or deleted from the respective arrays of non-volatile storage devices. The storage processors execute software that manages the incoming IO requests, and performs various data processing tasks to organize and secure the files, blocks, or other data elements on the non-volatile storage devices.

Such data storage systems can employ compression technology to better utilize storage resources on the non-volatile storage devices. Compression enables the data storage systems to store more data in the same amount of non-volatile storage space. One approach to compressing data involves performing inline compression on received data, and writing resulting compressed data to a non-volatile storage device.

SUMMARY

Unfortunately, there are drawbacks to prior approaches to compressing data in data storage systems. For example, a storage processor in a typical data storage system may compress data specified in an input/output (IO) write request one allocation unit (AU) or "block" at a time. A file system can have a block size of 8 kilobytes (KB). However, the typical data storage system can receive IO write requests that contain data with sizes that are not multiples of the block size of 8 KB. Such IO write requests are referred to herein as "unaligned IO requests."

For example, the typical data storage system may receive an unaligned IO request containing a chunk of data (or "chunk") with a size of 4 KB, i.e., one half of the block size of 8 KB. Because storage of such a chunk would not involve a complete overwrite of a compressed 8 KB block to a non-volatile storage device, the typical data storage system would be required to perform a read-modify-write sequence, including (i) reading a compressed 4 KB chunk from the non-volatile storage device, (ii) uncompressing the 4 KB chunk, (iii) merging the uncompressed 4 KB chunk with the 4 KB chunk contained in the unaligned IO request to form an 8 KB block, (iv) compressing the 8 KB block, and (v) writing the compressed 8 KB block to the non-volatile storage device. However, having to perform multiple read-modify-write sequences to process a sequential load of unaligned IO requests can place a significant burden on processing resources of the typical data storage system.

Techniques are disclosed herein for processing unaligned IO requests in data storage systems that provide optimization of inline compression. The disclosed techniques employ what is referred to herein as an "unaligned IO cache," which is used by a data storage system to process unaligned IO requests containing data with sizes that are not multiples of a predetermined block size. In one mode of operation, the data storage system receives an initial unaligned IO request that contains a first chunk of data that corresponds to a first half of a block of data. The first chunk therefore has a size equal to one half of the predetermined block size. In response to receipt of the initial unaligned IO request, the data storage system performs a read-modify-write sequence that includes (i) reading, from a non-volatile storage device, a compressed chunk that corresponds to a second half of the block of data, (ii) uncompressing the compressed chunk, (iii) merging the uncompressed chunk with the first chunk from the initial unaligned IO request to form a block with a size equal to the predetermined block size, (iv) storing the block in the unaligned IO cache, (v) compressing the block, and (vi) writing the compressed block to the non-volatile storage device.

Upon receipt of a subsequent unaligned IO request containing a second chunk of data that corresponds to the second half of the block of data, the data storage system performs a reduced sequence of operations that includes (i) determining whether a copy of the block in its current state resides in the unaligned IO cache, (ii) in response to determining that the copy of the block in its current state resides in the unaligned IO cache (i.e., in response to a "cache hit"), merging the copy of the block in its current state with the second chunk from the subsequent unaligned IO request to form a block with a size equal to the predetermined block size, (iii) compressing the block, and (iv) writing the compressed block to the non-volatile storage device. By employing an unaligned IO cache while processing unaligned IO requests containing data with sizes that are not multiples of a predetermined block size, data storage systems can reduce the number of read-modify-write sequences required to process a sequential load of unaligned IO requests, thereby reducing the burden on processing resources of the data storage systems.

In certain embodiments, a method of processing unaligned IO requests in a data storage system to provide optimization of inline compression includes receiving an initial unaligned IO request at a storage processor of the data storage system from a host computer, the initial unaligned IO request containing a first chunk having a size that is a first fraction of a block size supported by a file system of the data storage system, and, in response to the initial unaligned IO request: (i) reading, from a storage device of the data storage system, a compressed chunk having an uncompressed size that is a second fraction of the block size, (ii) uncompressing the compressed chunk, (iii) merging the first chunk with the uncompressed chunk to form a first block having the block size, and (iv) storing the first block in an unaligned IO cache of the data storage system. The method further includes receiving at least one subsequent unaligned IO request at the storage processor from the host computer, each subsequent unaligned IO request containing a second chunk having a size that is the second fraction of the block size, and, in response to the subsequent unaligned IO request: (i) retrieving the first block from the unaligned IO cache, (ii) merging the second chunk with the first block to form a second block having the block size, (iii) compressing the second block, and (iv) writing the compressed second block to the storage device of the data storage system.

In certain arrangements, the method further includes in response to the initial unaligned IO request: (v) compressing the first block, and (vi) writing the compressed first block to the storage device. In certain further arrangements, the second fraction of the block size is equal to the first fraction of the block size.

In certain further embodiments, a data storage system is provided that includes at least one storage device, a file system, an unaligned IO cache, a memory configured to store a set of instructions for processing unaligned IO requests to provide optimization of inline compression, and a storage processor configured to execute the set of instructions out of the memory:

to receive an initial unaligned IO request from a host computer, wherein the initial unaligned IO request contains a first chunk having a size that is a first fraction of a block size supported by the file system;

in response to the initial unaligned IO request:
(i) to read, from the storage device, a compressed chunk having an uncompressed size that is a second fraction of the block size;
(ii) to uncompress the compressed chunk;
(iii) to merge the first chunk with the uncompressed chunk to form a first block having the block size; and
(iv) to store the first block in the unaligned IO cache;

to receive at least one subsequent unaligned IO request from the host computer, wherein each subsequent unaligned IO request contains a second chunk having a size that is the second fraction of the block size; and in response to the subsequent unaligned IO request:
(i) to retrieve the first block from the unaligned IO cache;
(ii) to merge the second chunk with the first block to form a second block having the block size;
(iii) to compress the second block; and
(iv) to write the compressed second block to the storage device of the data storage system.

Other features, functions, and aspects of the invention will be evident from the Detailed Description that follows.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Techniques are disclosed herein for processing unaligned IO requests in data storage systems that provide optimization of inline compression. The disclosed techniques employ an unaligned IO cache, which is used by a data storage system to process unaligned IO requests containing data with sizes that are not multiples of a predetermined block size. By employing the unaligned IO cache while processing such unaligned IO requests, the data storage system can reduce the number of read-modify-write sequences required to process a sequential load of unaligned IO requests, thereby reducing the burden on processing resources of the data storage system.

Figure 1:
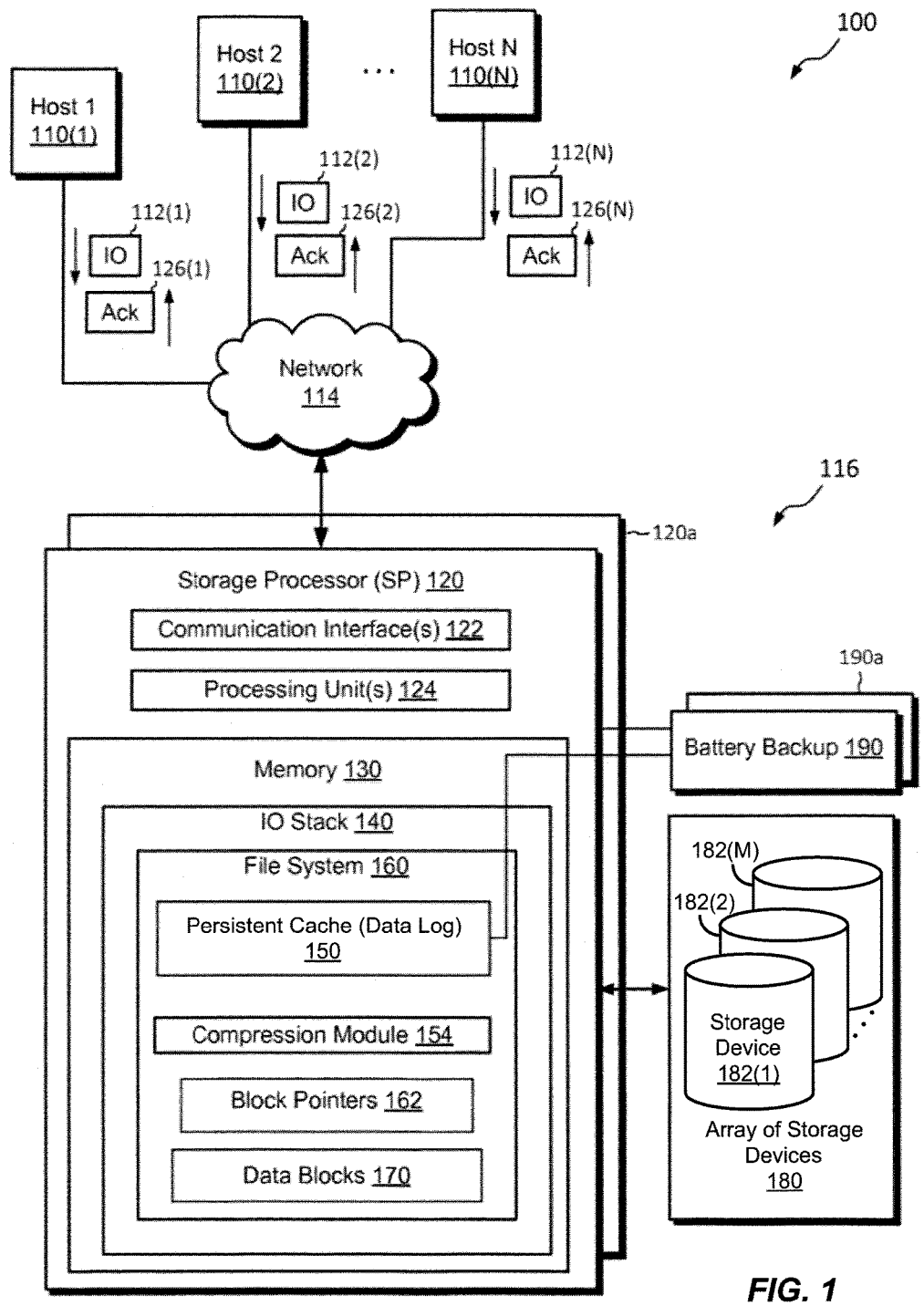
FIG. 1 is a block diagram of an exemplary environment in which processing of unaligned input/output (IO) requests in a data storage system to provide optimization of inline compression may be employed.

FIG. 1 depicts an illustrative embodiment of an exemplary environment 100, in which processing of unaligned input/output (IO) requests in a data storage system to provide optimization of inline compression may be employed. As shown in FIG. 1, the environment 100 includes a plurality of host computers 110(1), 110(2), . . . , 110(N) configured to access a data storage system 116 over a network 114. The data storage system 116 includes a storage processor (SP) 120 and an array of non-volatile storage devices 180, namely, storage devices 182(1), 182(2), . . . , 182(m). For example, the array of non-volatile storage devices 180 may be provided in the form of hard disk drives and/or electronic flash drives. The data storage system 116 can include multiple storage processors like the storage processor 120. For example, the data storage system 116 may include a second storage processor 120a. Multiple such storage processors 120, 120a can be provided as circuit board assemblies or "blades," which plug into a chassis that encloses and cools the respective storage processors. The chassis can have a backplane for interconnecting the storage processors, and additional connections can be made among the storage processors using cables. It is noted, however, that no particular hardware configuration is required, as any number of storage processors (including a single one) can be provided, and the storage processor 120 can be any type of computing device capable of processing host input/output (IO) requests.

It is further noted that the network 114 can be any type of network or combination of networks, such as, for example, a storage area network (SAN), a local area network (LAN), a wide area network (WAN), the Internet, and/or any other suitable network. Further, the host computers 110(1), 110(2), . . . , 110(N) can be configured to connect to the storage processor 120 using various technologies, such as, for example, Fibre Channel (e.g., through a SAN), iSCSI, NFS, SMB 3.0, and CIFS. Any number of the host computers 110(1), 110(2), . . . , 110(N) can be provided, using any of the above protocols, or any other suitable protocol or combination thereof. The storage processor 120 is configured to receive a plurality of IO requests 112(1), 112(2), . . . , 112(N) from the plurality of host computers 110(1), 110(2), . . . , 110(N), respectively, and to respond to such IO requests 112(1), 112(2), . . . , 112(N) by reading from and/or writing to the non-volatile storage devices 180.

As shown in FIG. 1, the storage processor 120 can include one or more communication interfaces 122, a set of processing units 124, and memory 130. The communication interfaces 122 can include adapters, such as, for example, SCSI target adapters and/or network interface adapters for converting electronic and/or optical signals received over the network 114 to electronic form for use by the storage processor 120. The set of processing units 124 can include one or more processing chips and/or assemblies. For example, the set of processing units 124 may include numerous multi-core central processing units (CPUs). The memory 130 can include both volatile memory (e.g., random access memory (RAM)) and non-volatile memory (e.g., one or more read-only memories (ROMs), disk drives, solid-state drives (SSDs)). The set of processing units 124 and the memory 130 together form control circuitry configured and arranged to carry out various methods and operations, as described herein. The memory 130 can further include a variety of software constructs realized in the form of executable instructions. When the instructions are executed by the set of processing units 124, the set of processing units 124 are caused to carry out the operations of the software constructs. Although certain software constructs are shown and described herein, it is noted that the memory 130 typically includes many other software constructs that are not shown, such as, for example, an operating system, various applications, processes, and/or daemons.

As further shown in FIG. 1, the memory 130 can include (i.e., realize by operation of programming code) an IO stack 140, which provides an execution path for the IO requests 112(1), 112(2), ..., 112(N). The IO stack 140 can contain a persistent cache (data log) 150, a compression module 154, a file system 160, block pointers 162, and data blocks 170. The underlying persistent data and metadata that support the file system 160 typically reside in the array of non-volatile storage devices 180. Portions of the memory 130 that support the data log 150 can be realized in volatile memory, such as, for example, dynamic random access memory (DRAM), within the storage processor 120. The storage processor 120a can have similar DRAM configured to mirror the DRAM of the storage processor 120. The data storage system 116 can further include battery backup 190, 190a connected to the storage processors 120, 120a, respectively, for powering their respective DRAMs in the event of an unexpected loss of power. The battery backups 190, 190a therefore make it possible for data in the data log 150 to be deemed persisted, even though they may be stored in volatile memory. Such persistence of the data allows the storage processor 120 to send acknowledgments 126(1), 126(2), ..., 126(N) to the host computers 110(1), 110(2), ..., 110(N), respectively, as soon as data contained in the IO requests 112(1), 112(2), ..., 112(N) are written to the data log 150 and mirrored to the storage processor 120a.

The persistent cache (data log) 150 is configured to log data directed to the file system 160 by the incoming IO requests 112(1), 112(2), ..., 112(N). For example, the persistent cache (data log) 150 may have a head and a tail, and may be arranged as a circular buffer. New entries into the persistent cache (data log) 150 can be placed at the tail of the log, and older entries can be flushed from the head of the log. Further, a cache manager 202 (see FIG. 2) can process incoming writes to the persistent cache (data log) 150, and perform flushing on a regular basis and/or in response to the persistent cache (data log) 150 reaching a first predetermined high water mark (HWM), thereby preventing the log from becoming full. Such flushing (see reference numeral 208) of an entry from the persistent cache (data log) 150 can include placing the data for that entry at the appropriate mapped locations within the file system 160, i.e., at the physical addresses indicated by the inodes, indirect blocks, etc., of the file system 160. For example, the cache manager 202 may flush a cache page of data at a time, in which a cache page contains the data specified in eight (8) IO write requests. As shown in FIG. 1, the persistent cache (data log) 150 can be embedded within the file system 160, and occupy a known set of physical addresses within the file system 160, such as, for example, within a contiguous range of physical addresses. It is noted, however, that other arrangements do not require the persistent cache (data log) 150 to be embedded within the file system 160. The compression module 154 includes instructions to cause one or more of the processing units 124 to compress data residing in the data log 150 in an inline fashion.

In one embodiment, the file system 160 is a container file system storing a container file representing a data object, such as, for example, a host file system (HFS), a virtual volume (VVOL), or a LUN. The storage processor 120 can host any number of such container file systems. Each such container file system can include a respective inode table, which includes inodes providing file-specific information about each file in the container file system. The information stored in each inode can include location information (e.g., block locations) where data of a respective file are stored. It is noted that a container file system can contain multiple files, with each file having its own entry in a respective inode table. In some arrangements, a container file system can store not only a file representing a data object, but also snapshots of that file.

It is further noted that a container file system can be allocated storage from a storage pool in the form of "slices," each of which corresponds to an increment of storage space, such as, for example, 256 megabytes (MB) or 1 gigabyte (GB), derived from the array of non-volatile storage devices 180. The storage pool can allocate slices to a container file system, such as the file system 160, for use in storing its files. The storage pool can also de-allocate slices from the container file system if the storage provided by the slices is no longer required. For example, a storage pool may create slices by accessing a redundant array of independent disks (RAID) group, dividing the RAID group into LUNS, and further dividing the LUNs into slices. The file system 160 can have a physical address space of file system block numbers (FSBNs), at which physical blocks in a non-volatile storage device reside and store some amount of data. The block pointers 162 are metadata that describe locations of data of a file in the file system 160. For example, the block pointers 162 may map the logical addresses specified in IO write requests to the physical addresses at which the file data is stored within the file system 160. The data storage system 116 can organize block pointers by logical addresses (i.e., logical offsets) within the file. The data blocks 170 represent storage units in which file data reside. The block pointers 162 point to the locations of the data blocks 170.

During operation, the data storage system 116 can receive an IO request 112 (see FIG. 2) from a respective host computer 110(1), 110(2), ..., or 110(N). The IO request 112 can specify a set of data to be written to the file system 160, such as, for example, at a designated logical address. For example, the IO request 112 may specify the logical address in the form of a file system identifier (FSID), a file identifier (ID), or a logical offset into a specified file. The logical address can provide all of the information needed to identify an allocation unit (AU) (e.g., a block, a chunk) to be written to a respective storage device 182(1), 182(2), ..., or 182(M). The IO request 112 enters the IO stack 140, which directs the IO request 112 to the persistent cache (data log) 150. For example, the cache manager 202 may create a new entry for the data specified in the IO request 112 in the persistent cache (data log) 150, e.g., at a tail of the log. The storage processor 120 can then send an acknowledgment 126 (see FIG. 2) of the IO request 112 to the respective host computer 110(1), 110(2), ..., or 110(N) once the data contained in the IO request 112 have been cached and mirrored.

The storage processor 120 can execute the compression module 154 to perform in-line compression of the data specified by the IO request 112 and stored in the persistent cache (data log) 150. For example, the storage processor 120 may execute the compression module 154 to compress the data contained in the IO request 112 in an in-line fashion, before the data is flushed from the persistent cache (data log) 150. It is noted that the storage processor 120 can compress the data contained in the IO request 112 one AU (e.g., one block, one chunk) at a time. For example, the file system 160 may be configured to handle AUs having sizes equal to 8 KB, which generally corresponds to the size of a block of data, or any other suitable size. Further discussion pertaining to in-line compression is provided in U.S. Pat. No. 9,779,023 issued Oct. 3, 2017 entitled STORING INLINE-COMPRESSED DATA IN SEGMENTS OF CONTIGUOUS PHYSICAL BLOCKS, the disclosure of which is hereby incorporated herein by reference in its entirety.

Figure 2:
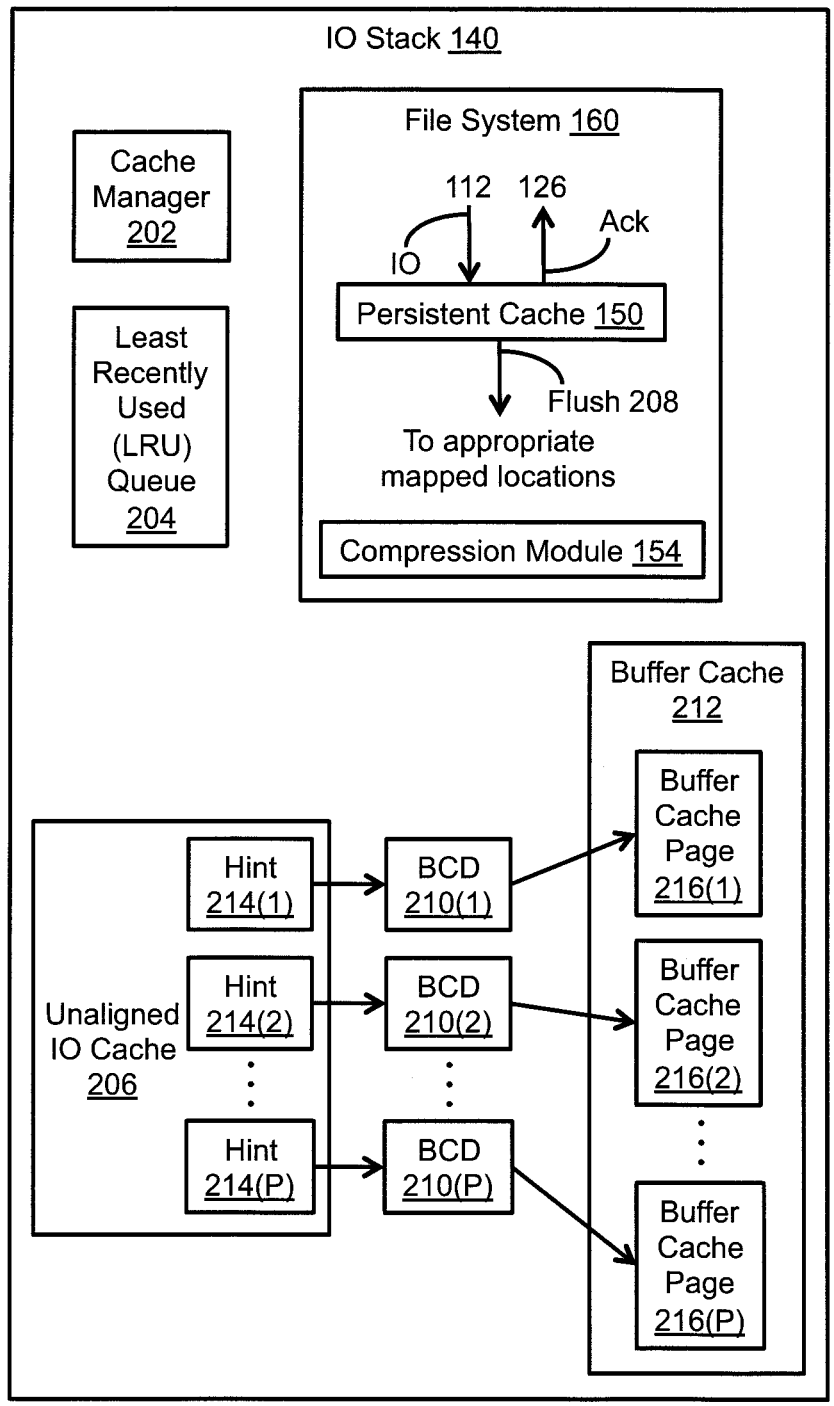
FIG. 2 is a block diagram of an exemplary IO stack of a storage processor included in the data storage system of FIG. 1, in which the IO stack includes an unaligned IO cache.

FIG. 2 depicts a detailed view the IO stack 140 including the file system 160 and the cache manager 202. As shown in FIG. 2, the IO stack 140 can further include an unaligned IO cache 206, a plurality of buffer cache descriptors (BCDs) 210(1), 210(2), . . . , 210(P), a buffer cache 212, and a least-recently-used (LRU) queue 204. The unaligned IO cache 206 can include a plurality of buffer hints (or "hint(s)") 214(1), 214(2), . . . , 214(P), and the buffer cache 212 can include a plurality of buffer cache pages 216(1), 216(2), . . . , 216(P). The data storage system 116 (see FIG. 1) can employ the unaligned IO cache 206, the plurality of BCDs 210(1), 210(2), . . . , 210(P), and the buffer cache 212 to process unaligned IO requests for the purpose of providing optimization of inline compression.

More specifically, the data storage system 116 can employ the unaligned IO cache 206, the plurality of BCDs 210(1), 210(2), . . . , 210(P), and the buffer cache 212 to process unaligned IO requests received from the respective host computers 110(1), 110(2), . . . , 110(N), in which the unaligned IO requests contain data with sizes that are not multiples of a predetermined block size, such as, for example, 8 KB, or any other suitable size. In one mode of operation, the storage processor 120 (see FIG. 1) receives an initial unaligned IO request from a respective one of the host computers 110(1), 110(2), . . . , or 110(N), in which the initial unaligned IO request contains a first 4 KB chunk of data that corresponds to a first half of an 8 KB block of data. In response to receipt of the initial unaligned IO request, the storage processor 120 performs a read-modify-write sequence that includes (i) reading, from a respective one of the non-volatile storage devices 182(1), 182(2), . . . , or 182(M), a compressed chunk that corresponds to a second half of the 8 KB block of data, (ii) uncompressing the compressed chunk to obtain a 4 KB chunk of data, (iii) merging the uncompressed 4 KB chunk with the first 4 KB chunk from the initial unaligned IO request to form an 8 KB block, (iv) storing the 8 KB block in the unaligned IO cache 206, (v) compressing the 8 KB block, and (vi) writing the compressed block to the respective non-volatile storage device 182(1), 182(2), . . . , or 182(M).

Upon receipt of a subsequent unaligned IO request containing a second 4 KB chunk of data that corresponds to the second half of the 8 KB block of data, the storage processor 120 performs a reduced sequence of operations that includes (i) determining whether a copy of the 8 KB block in its current state resides in the unaligned IO cache 206, (ii) in response to determining that the copy of the 8 KB block in its current state resides in the unaligned IO cache 206 (e.g., in response to a "cache hit"), merging the copy of the 8 KB block in its current state with the second 4 KB chunk from the subsequent unaligned IO request to form an 8 KB block, (iii) compressing the 8 KB block, and (iv) writing the compressed block to the respective non-volatile storage device 182(1), 182(2), . . . , or 182(M). By employing the unaligned IO cache 206 while processing unaligned IO requests containing data with sizes that are not multiples of a predetermined block size (e.g., 8 KB), the storage processor 120 can reduce the number of read-modify-write sequences required to process a sequential load of unaligned IO requests, thereby reducing the burden on processing resources of the data storage system 116.

The operation of the data storage system 116 for processing unaligned IO requests will be further understood with reference to the following illustrative example. In this example, the storage processor (see FIG. 1) processes an unaligned IO request from a respective host computer 110(1), 110(2), . . . , or 110(N), using the unaligned IO cache 206 (see FIG. 2) in conjunction with the plurality of BCDs 210(1), 210(2), . . . , 210(P), the buffer cache 212, and the LRU queue 204. Further discussion pertaining to BCDs, buffer caches, and LRU queues is provided in U.S. Pat. No. 9,727,479 issued Aug. 8, 2017 entitled COMPRESSING PORTIONS OF A BUFFER CACHE USING AN LRU QUEUE, the disclosure of which is hereby incorporated herein by reference in its entirety.

As described herein, the storage processor 120 can employ the unaligned IO cache 206 to process unaligned IO requests received from the respective host computers 110(1), 110(2), . . . , 110(N), in which the unaligned IO requests contain data with sizes that are not multiples of a predetermined block size (e.g., 8 KB). In this example, the storage processor 120 receives an initial unaligned IO request from a respective host computer 110(1), 110(2), . . . , or 110(N), in which the initial unaligned IO request contains a first 4 KB chunk corresponding to a first half of an 8 KB block. In response to receipt of the initial unaligned IO request, the storage processor 120 performs a read-modify-write sequence that includes, in part, (i) reading, from a respective non-volatile storage device 182(1), 182(2), . . . , or 182(M), a compressed chunk that corresponds to a second half of the 8 KB block, (ii) executing the compression module 154 to uncompress the compressed chunk to obtain an uncompressed 4 KB chunk, (iii) merging the uncompressed 4 KB chunk with the first 4 KB chunk from the initial unaligned IO request to form an 8 KB block, and (iv) storing a copy of the 8 KB block in the unaligned IO cache 206.

As further described herein, the IO stack 140 (see FIGS. 1 and 2) can include the buffer cache 212, which, in turn, can include the plurality of buffer cache pages 216(1), 216(2), . . . , 216(P). For example, each of the buffer cache pages 216(1), 216(2), . . . , 216(P) may have a fixed size, such as, for example, 8 KB. The IO stack 140 can further include the plurality of BCDs 210(1), 210(2), . . . , 210(P), each of which is configured to point to a respective buffer cache page 216(1), 216(2), . . . , or 216(P) included in the buffer cache 212. As shown in FIG. 2, the BCD 210(1) is configured to point to the buffer cache page 216(1), the BCD 210(2) is configured to point to the buffer cache page 216(2), and so on up to the BCD 210(P), which is configured to point to the buffer cache page 216(P). The plurality of hints 214(1), 214(2), . . . , 214(P) included in the unaligned IO cache 206 each contain a pointer to a respective BCD 210(1), 210(2), . . . , or 210(P). As shown in FIG. 2, the hint 214(1) points to the BCD 210(1), the hint 214(2) points to the BCD 210(2), and so on up to the hint 214(P), which points to the BCD 210(P).

In addition, the IO stack 140 can include the LRU queue 204, which is configured to manage, at least at some times, one or more of the buffer cache pages 216(1), 216(2), . . . , 216(P) and their associated BCDs 210(1), 210(2), . . . , 210(P), respectively. More specifically, the LRU queue 204 is configured to manage the buffer cache pages 216(1), 216(2), . . . , 216(P) and their associated BCDs that may no longer be in active use by the unaligned IO cache 206, but may still store valid blocks of data. For example, if data stored in a respective buffer cache page 216(1), 216(2), . . . , or 216(P) is determined to be no longer in active use (e.g., the data has not been accessed within a predetermined interval of time), then the BCD 210(1), 210(2), . . . , or 210(P) pointing to the respective buffer cache page 216(1), 216(2), . . . , or 216(P) may be placed, e.g., at a tail of the LRU queue 204, with the possibility of being re-accessed (and therefore removed) from the LRU queue 204 at a later time. However, once the buffer cache 212 becomes full (e.g., in response to the buffer cache 212 reaching a second predetermined HWM), the data associated with the least-recently-accessed BCD(s), e.g., at a head of the LRU queue 204, may be deleted from the buffer cache 212 to make room for other data to be stored in the buffer cache 212.

It is noted that each of the plurality of hints 214(1), 214(2), . . . , 214(P) included in the unaligned IO cache 206 can include a generation number, and each of the plurality of BCDs 210(1), 210(2), . . . , 210(P) can likewise include a generation number. Such generation numbers included in a hint, and the BCD to which the hint points, can be used to determine whether the data stored in the buffer cache page associated with the BCD is still valid, or whether the BCD has been reclaimed for use with different data. For example, matching generation numbers included in a hint and the BCD to which the hint points may signify that the data stored in the buffer cache page associated with the BCD is still valid, while mismatching generation numbers may signify that the BCD has been reclaimed. Further, when a respective BCD 210(1), 210(2), . . . , 210(P) is placed at the tail of the LRU queue 204, its generation number may remain unchanged to account for the possibility that the respective BCD 210(1), 210(2), . . . , or 210(P) may be re-accessed from the LRU queue 204 at a later time. However, once the respective BCD 210(1), 210(2), . . . , or 210(P) is extracted from the LRU queue 204, such as, for example, in response to a request for a "fresh" BCD and buffer cache page, its generation number may be updated (e.g., incremented), thereby causing a mismatch between the generation number of the BCD and the generation number of the hint that points to the BCD.

Having stored the copy of the 8 KB block formed from the merging of the uncompressed 4 KB chunk with the first 4 KB chunk from the initial unaligned IO request in the unaligned IO cache 206, or more specifically, in a respective buffer cache page 216(1), 216(2), . . . , or 216(P), such as, for example, the buffer cache page 216(1), the storage processor 120 causes the generation number included in the BCD 210(1) that points to the buffer cache page 216(1), and the generation number included in the hint 214(1) that points to the BCD 210(1), to match (e.g., each generation number may be set to one (1) or any other suitable number). The storage processor 120 then executes the compression module 154 to compress the 8 KB block, and writes the compressed block to the respective non-volatile storage device 182(1), 182(2), . . . , or 182(M).

Upon receipt of a subsequent unaligned IO request containing a second 4 KB chunk corresponding to the second half of the 8 KB block, the storage processor 120 performs a reduced sequence of operations. First, the storage processor 120 determines whether a copy of the 8 KB block in its current state resides in the unaligned IO cache 206. Such a determination can be made by the storage processor 120 in response to an attempt to retrieve the 8 KB block from the unaligned IO cache 206, resulting in a cache hit that specifies the hint 214(1). The storage processor 120 then attempts to resolve the hint 214(1) by determining whether the generation number included in the hint 214(1), and the generation number included in the BCD 210(1), match or mismatch (e.g., by a comparison of the generation numbers). Having determined that the generation numbers included in the hint 214(1) and the BCD 210(1) match, signifying that the copy of the 8 KB block resides in the unaligned IO cache 206 and contains valid data, the storage processor 120 accesses the copy of the 8 KB block from the buffer cache page 216(1), and merges the copy of the 8 KB block with the second 4 KB chunk from the subsequent unaligned IO request to form an 8 KB block. The storage processor 120 then executes the compression module 154 to compress the 8 KB block, and writes the compressed block to the respective non-volatile storage device 182(1), 182(2), . . . , or 182(M).

Figure 3:
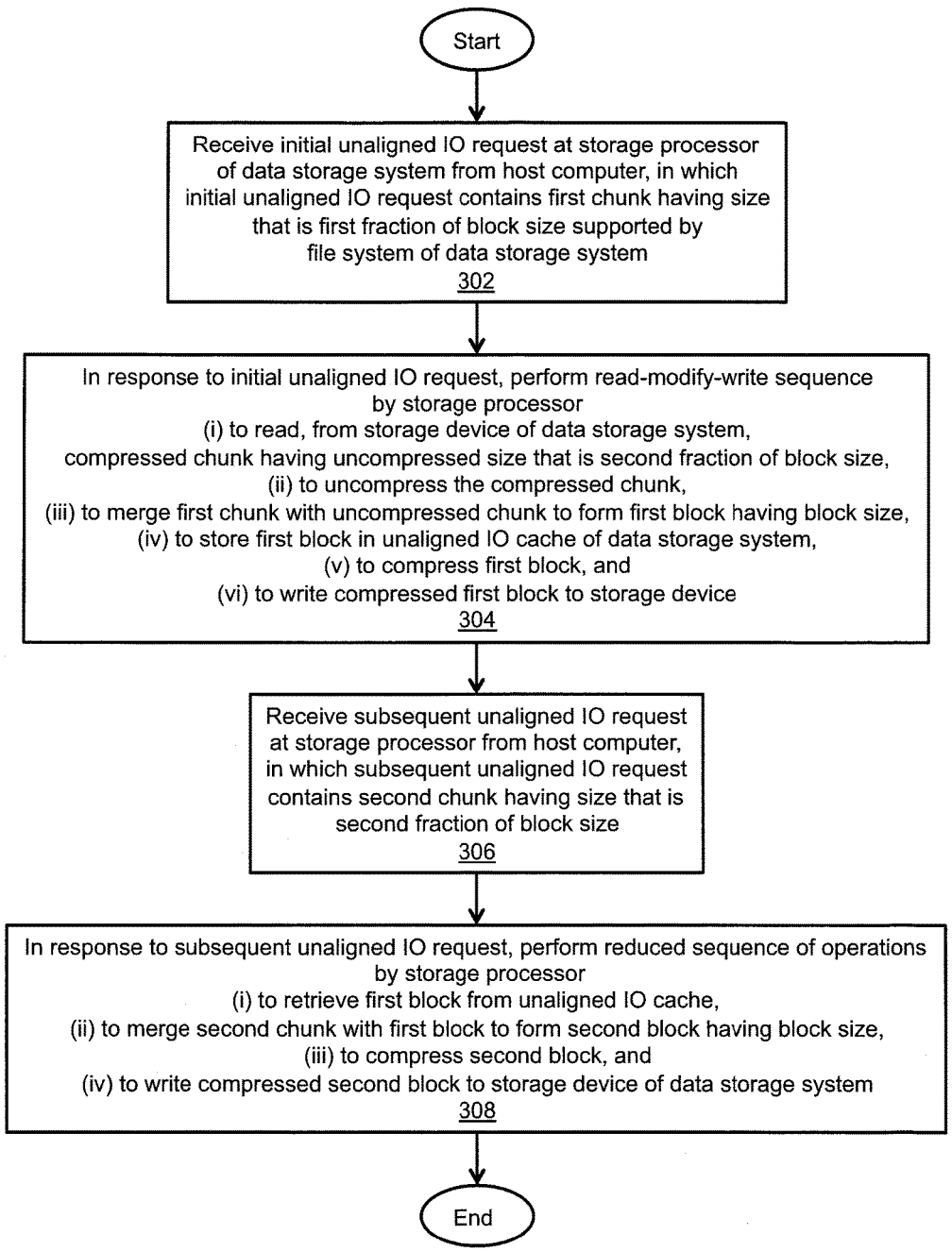
FIG. 3 is a flow diagram of an exemplary method of processing unaligned IO requests in the data storage system of FIG. 1 to provide optimization of inline compression.

An exemplary method of processing unaligned IO requests in a data storage system to provide optimization of inline compression is described below with reference to FIG. 3. As depicted in block 302, an initial unaligned IO request is received at a storage processor of the data storage system from a host computer, in which the initial unaligned IO request contains a first chunk having a size that is a first fraction of a block size supported by a file system of the data storage system. As depicted in block 304, in response to the initial unaligned IO request, a read-modify-write sequence is performed by the storage processor (i) to read, from a storage device of the data storage system, a compressed chunk having an uncompressed size that is a second fraction of the block size, (ii) to uncompress the compressed chunk, (iii) to merge the first chunk with the uncompressed chunk to form a first block having the block size, (iv) to store the first block in an unaligned IO cache of the data storage system, (v) to compress the first block, and (vi) to write the compressed first block to the storage device. As depicted in block 306, a subsequent unaligned IO request is received at the storage processor from the host computer, in which the subsequent unaligned IO request contains a second chunk having a size that is the second fraction of the block size. As depicted in block 308, in response to the subsequent unaligned IO request, a reduced sequence of operations is performed by the storage processor (i) to retrieve the first block from the unaligned IO cache, (ii) to merge the second chunk with the first block to form a second block having the block size, (iii) to compress the second block, and (iv) to write the compressed second block to the storage device of the data storage system.

Having described the foregoing techniques for processing unaligned IO requests in data storage systems that provide optimization of inline compression, other alternative embodiments and/or variations can be made and/or practiced. For example, it was described herein that a data storage system can receive two (2) unaligned IO requests, in which each unaligned IO request contains a 4 KB chunk corresponding to one half of an 8 KB block of data. It should be understood, however, that such an unaligned IO request can contain a fragment of data smaller than 4 KB, such as, for example, 2 KB, 1 KB, or any other suitable fragment of data.

Alternative embodiments can be directed to a computer program product, which stores instructions that, when executed by one or more processing units of a data storage system, cause the processing units to perform a method of processing unaligned IO requests in a data storage system to provide optimization of inline compression, such as the method described above. Some embodiments involve activity that is performed at a single location, while other embodiments involve activity that is distributed over multiple locations, e.g., over a network.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

In addition, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1050 in FIG. 10). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

While various embodiments of the invention have been particularly shown and described, it will be understood by those skilled in the art that various changes in form and details may be made therein without departing from the scope of the invention as defined by the appended claims.

What is claimed is:

1. A method of processing unaligned IO requests in a data storage system to provide optimization of inline compression, comprising:
   receiving an initial unaligned IO request at a storage processor of the data storage system from a host computer, the initial unaligned IO request containing a first chunk having a size that is a first fraction of a block size supported by a file system of the data storage system;
   in response to the initial unaligned IO request:
      (i) reading, from a storage device of the data storage system, a compressed chunk having an uncompressed size that is a second fraction of the block size;
      (ii) uncompressing the compressed chunk;
      (iii) merging the first chunk with the uncompressed chunk to form a first block having the block size; and
      (iv) storing the first block in an unaligned IO cache of the data storage system;
   receiving at least one subsequent unaligned IO request at the storage processor from the host computer, the at least one subsequent unaligned IO request containing a second chunk having a size that is the second fraction of the block size; and
   in response to the at least one subsequent unaligned IO request:
      (i) retrieving the first block from the unaligned IO cache;
      (ii) merging the second chunk with the first block to form a second block having the block size;
      (iii) compressing the second block; and
      (iv) writing the compressed second block to the storage device of the data storage system,
   wherein the storing of the first block in the unaligned IO cache of the data storage system includes storing the first block in a buffer cache page of a buffer cache, and
   wherein the storing of the first block in the buffer cache page of the buffer cache includes updating a pointer of a buffer cache descriptor to point to the buffer cache page storing the first block.

2. The method of claim 1 further comprising:
   in response to the initial unaligned IO request:
      (v) compressing the first block; and
      (vi) writing the compressed first block to the storage device.

3. The method of claim 1 wherein the reading of the compressed chunk includes reading the compressed chunk having the uncompressed size that is the second fraction of the block size, the second fraction of the block size being equal to the first fraction of the block size.

4. The method of claim 1 wherein the unaligned IO cache includes a buffer hint, and wherein the storing of the first block in the buffer cache page of the buffer cache further includes updating a pointer of a buffer hint to point to the buffer cache descriptor.

5. The method of claim 4 wherein the buffer cache descriptor includes a first generation number and the buffer hint includes a second generation number, and wherein the retrieving of the first block from the unaligned IO cache includes comparing the first generation number of the buffer cache descriptor to the second generation number of the buffer hint to determine whether the first block is valid.

6. The method of claim 1 further comprising:
   in response to the first block not being in active use, placing the buffer cache descriptor into a least-recently-used (LRU) queue of the data storage system.

7. A data storage system, comprising:
   at least one storage device;
   a file system;
   an unaligned IO cache;
   a memory configured to store a set of instructions for processing unaligned IO requests to provide optimization of inline compression; and
   a storage processor configured to execute the set of instructions out of the memory:
      to receive an initial unaligned IO request from a host computer, wherein the initial unaligned IO request contains a first chunk having a size that is a first fraction of a block size supported by the file system;
      in response to the initial unaligned IO request:
         (i) to read, from the storage device, a compressed chunk having an uncompressed size that is a second fraction of the block size;
         (ii) to uncompress the compressed chunk;
         (iii) to merge the first chunk with the uncompressed chunk to form a first block having the block size; and
         (iv) to store the first block in the unaligned IO cache;
      to receive at least one subsequent unaligned IO request from the host computer, wherein the at least one subsequent unaligned IO request contains a second chunk having a size that is the second fraction of the block size;

in response to the at least one subsequent unaligned IO request:
- (i) to retrieve the first block from the unaligned IO cache;
- (ii) to merge the second chunk with the first block to form a second block having the block size;
- (iii) to compress the second block; and
- (iv) to write the compressed second block to the storage device of the data storage system;

to store the first block in a buffer cache page of a buffer cache; and to update a pointer of a buffer cache descriptor to point to the buffer cache page storing the first block.

8. The data storage system of claim 7 wherein the storage processor is further configured to execute the set of instructions out of the memory:
in response to the initial unaligned IO request:
- (v) to compress the first block; and
- (vi) to write the compressed first block to the storage device.

9. The data storage system of claim 7 wherein the second fraction of the block size is equal to the first fraction of the block size.

10. The data storage system of claim 7 wherein the unaligned IO cache includes a buffer hint, and wherein the storage processor is further configured to execute the set of instructions out of the memory:
updating a pointer of a buffer hint to point to the buffer cache descriptor.

11. The data storage system of claim 10 wherein the buffer cache descriptor includes a first generation number, wherein the buffer hint includes a second generation number, and wherein the storage processor is further configured to execute the set of instructions out of the memory:
comparing the first generation number of the buffer cache descriptor to the second generation number of the buffer hint to determine whether the first block is valid.

12. The data storage system of claim 7 wherein the storage processor is further configured to execute the set of instructions out of the memory:
in response to the first block not being in active use, to place the buffer cache descriptor into a least-recently-used (LRU) queue of the data storage system.

13. A computer program product having a non-transitory computer readable medium that stores a set of instructions that, when carried out by computerized circuitry, cause the computerized circuitry to perform a method of processing unaligned IO requests in a data storage system to provide optimization of inline compression, the method comprising:
receiving an initial unaligned IO request at a storage processor of the data storage system from a host computer, the initial unaligned IO request containing a first chunk having a size that is a first fraction of a block size supported by a file system of the data storage system;

in response to the initial unaligned IO request:
- (i) reading, from a storage device of the data storage system, a compressed chunk having an uncompressed size that is a second fraction of the block size;
- (ii) uncompressing the compressed chunk;
- (iii) merging the first chunk with the uncompressed chunk to form a first block having the block size; and
- (iv) storing the first block in an unaligned IO cache of the data storage system;

receiving at least one subsequent unaligned IO request at the storage processor from the host computer, the at least one subsequent unaligned IO request containing a second chunk having a size that is the second fraction of the block size; and in response to the at least one subsequent unaligned IO request:
- (i) retrieving the first block from the unaligned IO cache;
- (ii) merging the second chunk with the first block to form a second block having the block size;
- (iii) compressing the second block; and
- (iv) writing the compressed second block to the storage device of the data storage system wherein the storing of the first block in the unaligned IO cache of the data storage system includes storing the first block in a buffer cache page of a buffer cache, and wherein the storing of the first block in the buffer cache page of the buffer cache includes updating a pointer of a buffer cache descriptor to point to the buffer cache page storing the first block.

14. The method of claim 13 further comprising:
in response to the initial unaligned IO request:
- (v) compressing the first block; and
- (vi) writing the compressed first block to the storage device.

15. The method of claim 13 wherein the reading of the compressed chunk includes reading the compressed chunk having the uncompressed size that is the second fraction of the block size, the second fraction of the block size being equal to the first fraction of the block size.

16. The method of claim 13 wherein the unaligned IO cache includes a buffer hint, and wherein the storing of the first block in the buffer cache page of the buffer cache further includes updating a pointer of a buffer hint to point to the buffer cache descriptor.

* * * * *